James E. Riley
Billy B. Williams
*INVENTORS*

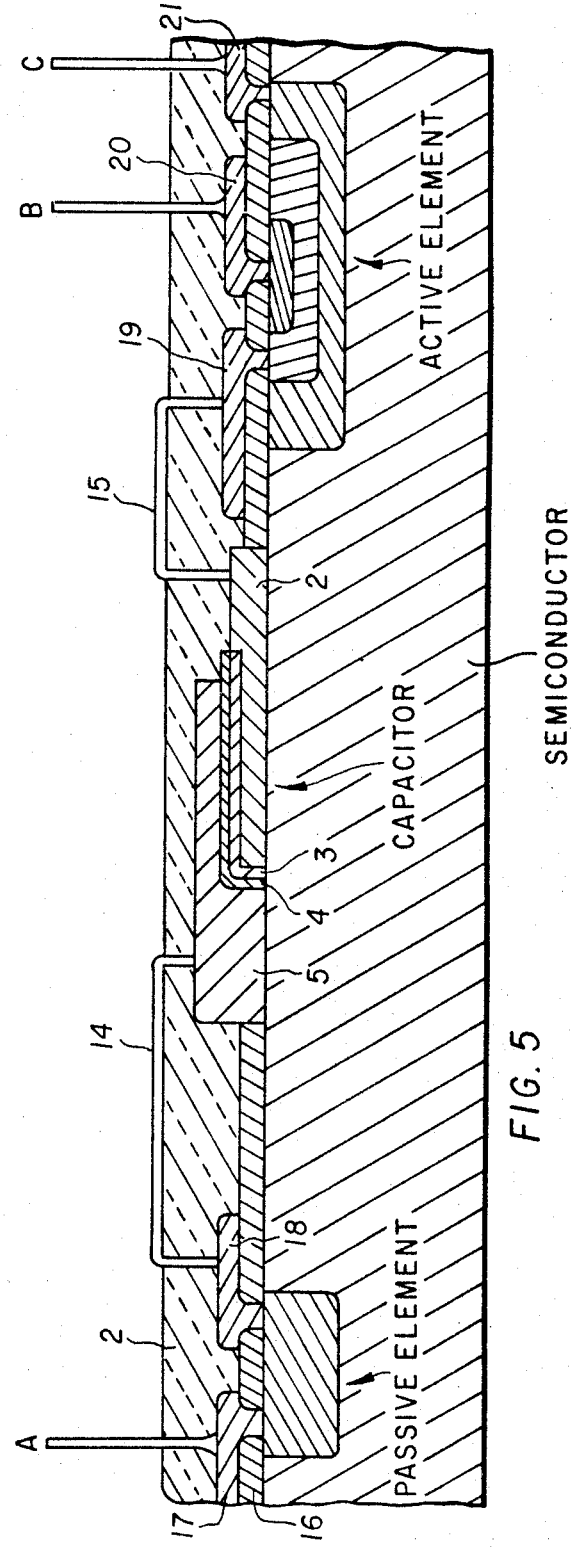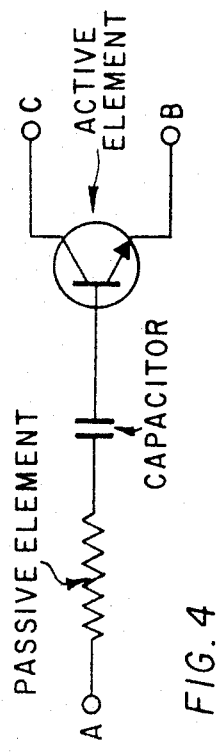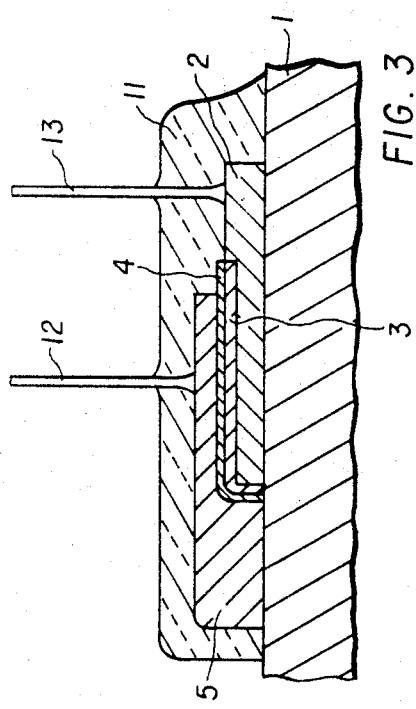

United States Patent Office 3,432,918
Patented Mar. 18, 1969

3,432,918
METHOD OF MAKING A CAPACITOR BY VACUUM DEPOSITING MANGANESE OXIDE AS THE ELECTROLYTIC LAYER
James E. Riley and Billy B. Williams, Richardson, Tex., assignors to Texas Instruments Incorporated, Dallas, Tex., a corporation of Delaware
Original application Nov. 12, 1963, Ser. No. 322,751, now Patent No. 3,320,484, dated May 16, 1967. Divided and this application Sept. 13, 1966, Ser. No. 579,010
U.S. Cl. 29—570    4 Claims
Int. Cl. B10j 17/00; H01g 9/00; C23c 13/00

ABSTRACT OF THE DISCLOSURE

Disclosed is a method of forming a thin-film capacitor by forming from the vapor phase a layer of manganese oxide on a dielectric layer prior to the formation of a second thin-film metal electrode.

---

This application is a division of co-pending application Ser. No. 322,751, filed Nov. 12, 1963 and now Patent No. 3,320,484.

This invention relates to dielectric devices, and more particularly to solid state capacitor elements.

The present micro-miniaturization activity, which has its origin in the early work on thin film components of the printed type, has exacted and made evident the need for capacitors having a large capacitance-to-volume ratio. While the wet electrolytic type capacitor satisfies the general requirement of high capacitance per unit volume, it has a serious inherent disadvantage due to the liquid electrolyte employed. Furthermore, employment of a liquid electrolyte is not compatible with highly advanced microcircuits. More compatible with the micro-miniaturization trend within industry is the thin film capacitor element which may be produced entirely by vapor phase techniques or which can be formed by thermally oxidizing a surface of a semiconductor wafer, such as silicon, and using this oxide layer as a dielectric.

It is well established that a current blocking film can be electrochemically formed on certain elements, usually defined as the "valve metals," which include the elements tantalum, niobium, aluminum, silicon, titanium, zirconium, and others. This film is considered to be a very stable oxide and serves to block the flow of current if placed into a sandwich between appropriately biased metal electrodes. Its normal method of preparation comprises making the metal anodic in a suitably conducting oxygen-ion supplying solution. The various methods of preparing the dielectric films are discussed by Young, Anodic Oxide Films, Academic Press, New York, 1961. Reactive sputtering and thermal oxidation techniques have also been found useful.

The primary object of this invention is to provide an improved large area thin film dielectric device more compatible with the demands of micro-miniaturized electrical active and passive circuit elements.

Another object of this invention is to provide for a continuous, thin film electrolyte composition in dielectric structures.

More specifically, an object is to provide for a highly reliable, large area, thin film capacitor element employing a solid state electrolyte composed of an oxide of manganese.

We have found that a substantial increase in the reliability of micro-circuits can be obtained, as well as a desirable size reduction, by selecting certain thin film technologies. The preparation of thin film semiconductor networks from patterned area interrelations of thin films of electronic materials on various structural base material has been produced to perform certain electronic functions analogous to those of discrete electronic components assembled in a predetermined fashion. We have also found that hybrid circuits utilizing thin film integrated circuits, coupled with other packaging techniques, can be used with considerable advantage by selecting the desirable properties of each. We have found furthermore that thin film technologies meet the requirements of reliability under a wide range of environmental conditions due to the availability of many materials which fulfill the requirements of the application, and the wide choice of structure and pattern.

The attainment of the desired capacitance values in a large area capacitor depends upon the proper combination of a high dielectric-constant material in very thin configurations. One approach, and perhaps the simplest one, is to deposit an extremely thin dielectric layer onto a previously deposited conductor. This dielectric layer can be any one of a number of dielectric materials such as a valve metal oxide, a polymeric material, a vitreous ceramic, or a compound such as boron nitride or silicon nitride. Also useful would be sprayed dielectric materials produced by use of flame or plasma jet techniques, especially for the aluminum-and-alumina combination of materials. We have found that the order of thickness for the dielectric film in capacitors must be in excess of 100 A. to preclude conductive mechanisms from taking place such as tunneling, field-emission, etc. Furthermore, when employing film thicknesses of only 100 A. or so, the pin hole problem increases very rapidly. While use of the electrolyte as herein described tends to minimize the pin hole problem, it is nevertheless undesirable to have too thin dielectric layers. The preferable range of dielectric thicknesses ranges from slightly less than a thousand to several thousand Angstroms.

In accordance with the instant invention, significantly improved breakdown voltages have been obtained for large area capacitors by providing a very thin film of a solid state manganese oxide electrolyte in contact with the dielectric layer. The use of an oxide dielectric of a multivalent transition metal is especially useful, but other dielectrics such as the various titanates might also be employed. The source of the manganese oxide electrolyte is through (1) the extremely carefully controlled low temperature pyrolytic decomposition of highly concentrated aqueous permanganic acid, (2) chemical decomposition of permanganic acid solutions, and (3) decomposition of permanganic acid in an electrolytic bath. The critical decomposition process for the permanganic acid must be precisely controlled so as to provide for the necessary adherence, film structure and electrical properties thereof.

The novel feature believed characteristic of the present invention are set forth in the appended claims. A more detailed description of this invention is obtainable by considering the following detailed specification and the appended drawings, in which:

FIGURE 3 illustrates the capacitor of FIGURE 1 encapsulated according to the invention.

FIGURE 4 illustrates a schematic version of a simple circuit capable of being embodied in an integrated circuit, and FIGURE 5 illustrates an integrated circuit embodying the circuit of FIGURE 4.

Figure 1:
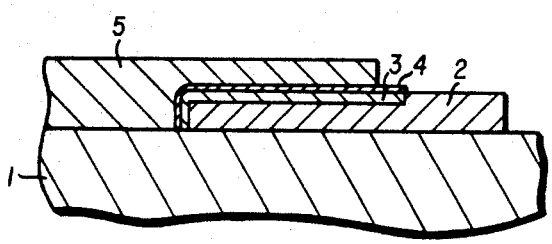
FIGURE 1 illustrates a large area thin film capacitor constructed in accordance with this invention.

In FIGURE 1 there is shown a sectional view of a capacitor which is particularly useful in printed type circuitry and in other thin film micro-circuits, as well as in individual or discrete components and which comprises a substrate 1 of alumina. The substrate can be suitably another ceramic, a refractory metal, or a vitreous material of a refractory nature. A tantalum anode layer 2 about 3,000 A. in thickness is sputtered, or can be vacuum evaporated or otherwise deposited, onto the substrate 1, with a dielectric layer 3 of $Ta_2O_5$ being anodically produced thereupon. This dielectric layer 3 might also be prepared by various vapor techniques including reactive sputtering or by employing tantalum in a highly oxidizing ambient, or can suitably consist of vapor deposited thin films of other dielectrics herein enumerated. Vapor deposited onto the dielectric layer 3 in a very thin film 4 of manganese oxide resulting from the in-situ pyrolytic decomposition of a concentrated aqueous permanganic acid solution on the slightly heated dielectric substrate 3. A counterelectrode 5 of gold, or other suitable conducting material, such as aluminum, silver, nickel, tantalum, etc., is vapor deposited through a mask onto the manganese oxide film 4 to complete the capacitor element. While tantalum has been found particularly desirable for such thin film large area capacitor structures, other valve metals can also be employed. As illustrated in FIGURES 1, 2, 3, and 5, the substrates, anodes, dielectric layers and the layers of solid electrolyte are substantially flat, or as commonly used in the art, are substantially planar.

Figure 2:
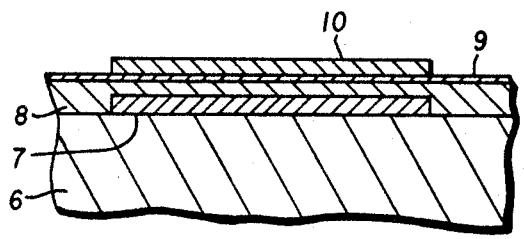
FIGURE 2 is an electrical capacitor element and represents one embodiment of this invention.

FIGURE 2 illustrates another embodiment of this invention and can be an individual capacitor element suitably connected to other active and passive components within a circuit, or it can be an integral part of a semiconductor network. It has been found that when the capacitor element is made an integral part of the semiconductor integrated circuit, the substrate 6, a silicon single crystal wafer substrate, is suitably the same single crystalline substrate which serves as the base material for other active and passive elements within the integrated circuit, and can suitably be gallium arsenide GaAs as well. Vapor deposited onto the silicon substrate 6 is an aluminum plate 7 which functions as the capacitor anode. Overlying this anode is a thin dielectric layer 8 composed of $TiO_2$, over which is vapor-deposited a solid thin film of $MnO_2$ 9 in contiguous relationship with the dielectric layer 8. Thin film 9 is suitably prepared by heating the dielectric substrate assembly to a temperature of 80° C. and evaporating a concentrated aqueous permanganic acid solution on the surface thereof to effect pyrolytic decomposition to produce an amorphous thin film approximately 500 A. to 1,000 A. in thickness. The aluminum counterelectrode 10 is vapor deposited over the $MnO_2$ thin film 9. The dielectric layer 8 can suitably be another valve metal oxide, a vitreous ceramic, a fluoride such as cerium fluoride, magnesium fluoride, or can be an organic layer. Various valve metals, and their oxides are described by Young, Anodic Oxide Films, on page 4. The entire capacitor element can be repeated and stacked on top of the device shown in FIG. 2, and followed by a final deposition of material to provide a completely sealed circuit element, with various vitreous and polymeric materials being suitable. In this manner multiple stacked dielectric elements can be provided.

FIGURE 3 illustrates the capacitor of FIGURE 1 encapsulated in a vitreous encapsulation means 11, for example, glass. The leads 12 and 13 are respectively formed to the regions 5 and 2, for example, by conventional bonding or soldering techniques, preferably being connected to said regions prior to the encapsulation in the glass.

If superior results are to be obtained, the manganese oxide electrolyte must be substantially noncrystalline, since in the amorphous condition it has the capability of performing best its function of preventing the metallic counterelectrode mobile ions from combining with defects in the anodic or dielectric film. Continuity of structure, as well as adhesion of the dry electrolytes, is also a direct function of the basic structure and its ultimate electrical parameters.

While the true working functions of the semiconductor solid state electrolyte in dielectric structures are not completely understood, we have found that a superior capacitor can be produced by employing the special material described herein. We have found that not only can the breakdown voltages be significantly increased, but that more reliable capacitor structures can be produced. Experimental data also shows that high capacitance values per unit area can be obtained by following the present invention. The electrolyte consists essentially of amorphous $MnO_x$, X being approximately the value 2, with oxygen-to-manganese ratios of from 1.3 to 3.0 having been evaluated. The preferred oxygen-to-manganese ratio is slightly under the value 2. The electrolyte oxide of manganese fulfills the following requirements:

(1) It provides the electrical contact to the dielectric film,
(2) it provides for self-healing of dielectric layer imperfections,
(3) it provides a low stable resistance, insensitive to temperature, voltage and frequency,
(4) it is chemically inert and substantially non-reactive with the dielectric film, and
(5) it can be readily applied in continuous very thin films.

Certain other novel features of this solid state electrolyte material are disclosed in copending application Ser. No. 322,768, by James E. Riley, and assigned to the assignee of the present invention.

The manganese oxide electrolyte, which is capable of preventing the metallic mobile counterelectrode material from combining with defects or imperfections in the dielectric film, is preferably provided through the decomposition of a 90% aqueous solution of permanganic acid, $HMnO_4$. This solution is vapor deposited, preferably by employing a low pressure cloud chamber, or by spraying under pressure, onto the dielectric film assembly which is maintained at a temperature in the range of from 20° to 100° C., with 80° C. being satisfactory. Actually, the oxide of manganese is produced in-situ on the slightly heated dielectric film during the evaporation step. The applied manganese oxide film has a thickness of the order of several molecular layers up to several thousand Angstroms. A particularly suitable electrolyte thickness is from 500 to 1,500 A. By employing various gas phase methods, it is found possible to obtain monomolecular thicknesses and to secure rather exacting layer thicknesses, while yet maintaining absolute continuity of the electrolyte film.

Use of colloidal manganese dioxide in the size range of less than about 20 microns, while providing certain advantages, is normally more difficult to handle, and the providing of continuous thin films is difficult. However, one can obtain very careful control of the manganese-to-oxygen ratio when employing specially prepared colloidal manganese dioxide. Furthermore, the temperature problems of pyrolysis and corrosive byproducts of the reaction are precluded. Various organometallics of manganese have also been employed for the purpose of obtaining a suitable oxide of manganese for electrolyte purposes. Chemical reduction of various permanganate-ion-containing compounds have been attempted, with formic acid, methyl alcohol, acetone, and formaldehyde providing the most desirable manganese oxide properties.

A very thin film of $MnO_2$ can also be evaporated onto a dielectric as a counterelectrode. It has been found that manganese dioxide, deposited according to the instant invention, has a resistivity of approximately 100 ohm-cm., and is therefore considered to be a reasonably good conducting oxide. This oxide conductor, or semiconductor, is considered to be especially useful as a self-sealing material since when exposed to high current densities it becomes converted to a lower oxide form. The lower oxide form of manganese oxide, usually $Mn_2O_3$, $Mn_3O_4$, has a resistivity of approximately $10^8$ ohm-cm. and is, therefore, a very useful dielectric and the presence of it effectively heals any underlying dielectric layer imperfections. This particular manganese oxide, prepared in accordance with this invention, is therefore extremely useful in thin film dielectric structures, especially those based on oxide-containing dielectrics.

Use of amorphous thin films of manganese oxide in accordance with this invention, as counterelectrodes and as solid state electrolytes for vapor phase or electrochemically deposited substantially two-dimensional thin film semiconductor microcircuitry, is particularly desirable since such close control of dielectric structures is thereby made possible. The film is considered two-dimensional because the thickness of the film is almost negligible. Furthermore, film thicknesses can be very accurately controlled, thereby providing for improved large area thin film capacitor devices. The preparation of dielectric materials by reactive sputtering has been found desirable. Titanium dioxide thin film capacitor structures with extremely high capacitance value have been produced by this method. Good results have also been obtained by reactive sputtering of silicon in an oxidizing ambient. Preparation of the dielectric electrodes and counterelectrodes by cathode sputtering may be accomplished by following the teachings of Holland, Vacuum Deposition of Thin Films, Wylie & Sons, Inc., New York, 1956.

Another type of capacitor is formed by thermally oxidizing a surface of a silicon wafer, or other low resistance semiconductor surface, and using this oxide layer as a dielectric. Inasmuch as this oxide is formed on a single crystalline substrate, it is normally free of defects. Capacitors have been formed with an 8,000 A. unit oxide layer which will withstand 90 volts. The oxide is believed to be silicon dioxide, which is unusually stable with temperature. Various tests have shown that the temperature characteristic of this capacitor embodiment is quite flat, and continues to remain flat to at least a temperature of 150° C. and it is believed to be good at even higher temperatures. Capacitance values of 10,000 $\mu\mu f.$ per square centimeter can be readily obtained in this manner. By providing silicon semiconductor junctions, and by employing heavy doping levels on both sides of the junction, capacitance values up to 100,000 $\mu\mu f.$ per square centimeter are obtainable. Capacitors have been made which withstand several hundred volts but, unfortunately, these devices had much lower capacitance values. By employing the substrate itself as the source material for the dielectric layer, one provides for a compatible integrated circuit element inasmuch as resistors, diodes, and transistors can be included within and made an integral part of the same semiconductor substrate. Thus, with the proper selection and shaping of conducting paths on top of, as well as within the interior of a semiconductor wafer, we have found that it is possible to realize many simple electronic functions such as impedance, amplification, rectification, and so forth, as well as to realize more complex electronic functions, and to combine these characteristics in any desired fashion to produce a desired circuit function. Thus, it is seen that the truly integrated circuit is produced wherein it is not normally possible to distinguish one circuit element from another.

In another embodiment extremely high capacitance values were obtained by selecting tantalum pentoxide as the insulating material. We have found that an extremely useful thin film capacitor can be prepared by taking a film of tantalum and employing it as the anode and anodizing it at 200 volts and approximately 25° C. so as to provide for the $Ta_2O_5$ dielectric layer. Thereafter, $MnO_2$ was deposited as a film on the $Ta_2O_5$ by spraying a concentrated permanganic acid solution against the heated dielectric assembly maintained at a temperature of approximately 80° C. Thereafter a counterelectrode of aluminum was provided to complete the capacitor structure.

In still another embodiment, tantalum was sputtered onto a vitreous material surface, and thereafter anodized to produce a $Ta_2O_5$ dielectric layer overlying the sputtered tantalum metal film. The anodized film was then subjected to vapors of permanganic acid in a vapor chamber to effect production in situ of $MnO_x$ on the unmasked areas of the dielectric film. Gold was evaporated on the $MnO_2$ layer as the counterelectrode. $HMnO_4$ evaporation techniques have been found especially useful, and decomposition temperatures as high as 150° C. for 1 to 8 minutes have been employed with good results. The aluminum counterelectrode should be preferably evaporated onto the $MnO_2$ film while the substrate is maintained at room temperature, and preferably at a temperature not to exceed 125° C.

The permanganic acid can be applied through an anodizing bath to eliminate the steps of directly applying the electrolyte. Exceedingly good thin films of $MnO_2$ have been prepared by this method. The use of permanganic acid in the anodizing solution has resulted in considerably increased yields, and experimental data supports the conclusion that an increase in reliability can also be obtained. Other economies are obtained which include the virtual simultaneous realization of the anodic dielectric films and the electrolyte films. Only a small amount of the acid is actually utilized during the anodization and of course the remaining concentrated solution can be reused. Good results have been obtained by maintaining the acid solution up to a temperature of approximately 85° C., while anodization of the film is performed with optimum results at 25° C. with a voltage increase of two volts per minute. The acid solution contains phosphoric acid in deionized water with a sufficient amount of permanganic acid being added to the solution to bring the resistivity down to approximately 100 ohm-cm. Variations from this anodizing solution have also been employed with satisfactory results.

It has been found in a qualitative way that purity of the atmosphere in which the electrodes are sputtered affects the film conductivity as well as the anodizing characteristics thereof. It has been found that film conductivity is a linear function of formation voltage and this characteristic offers a more suitable means for trimming film resistors to a predetermined value by anodizing, and therefore is effective in preparing mircrocircuits. In connection with a constant voltage rise anodization program of approximately 2 volts per minute, optical measurements showed a tantalum oxide growth rate of 14.1 A. per voltaon vitreous substrates, and 16.5 A. per volt on glazed alumina substrates.

The particular substartes that have been employed for tantalum large area film capacitors influence leakage as well as capacitance values, especially when the units are subjected to temperature and humidity cycling. Glazed alumina substrates showed less change in capacitance values than did the experimental units prepared by employing glass as the substrate. Silicone rubber coatings were found especially useful for protecting the devices and were considerably more effective than hard epoxy coatings. Other vitreous materials appear to give considerable protection and have been found useful in providing a protective coating for the completed dielectric structure. The employment of these dielectric sandwich devices in microcircuitry and ultimately the incorporation of various types of passive film components in combination with semiconductor active components to form a hybrid type of integrated circuit make the devices according to the invention more compatible with the use of various vitreous protective methods. It has been found that various multiples of the capacitor structure of the type shown in FIGS. 1 and 2 can be suitably employed in hybrid types of integrated circuitry, a typical circuit being the one schematically illustrated in FIGURE 4 and shown in section in FIGURE 5 as an integrated circuit. In FIGURES 4 and 5, a passive element, for example, a resistor, is connected to a capacitor fabricated according to the invention, which is, in turn, connected to an active element, for example, a transistor. The resistor is formed in the semiconductor substrate, for example, by diffusion, and metallized regions 17 and 18 make a conductive path to the resistor through the silicon oxide layer 16. The capacitor is fabricated on the semiconductor substrate in a similar manner to that of FIGURE 1 or 2, and the transistor or active element is formed in the substrate, also by diffusion or other conventional semiconductor techniques. The metal regions 19, 20 and 21 make contact to the base, emitter and collector regions of said transistor respectively. Lead wires A, B and C make a conductive (ohmic) contact to the regions 17, 20 and 21, respectively. The metal region or wire 14 electrically connects the region 18 with the electrode layer 5 of the capacitor. Likewise, the metal connecting means 15 connects the electrode 2 to the metal region 19. Encapsulation means 22, for example, glass, is used to cover the one surface of the integrated circuit except for the lead means which protrude through and out of said encapsulation. In such hybrid structures, the value metal is deposited on the SiO₂, or other glassy materials, and then anodized, with a subsequent deposition of a very thin film of manganese oxide followed by deposition of a metallic counterelectrode. This dielectric assembly is then provided with a coating of vitreous material which is appropriately etched away to expose selected areas of the metallic electrodes, and connecting patterns of metal are then deposited onto the exposed electrode areas and overlying the glassy areas which cover the surfaces of the active and passive circuit elements. These connector patterns making contact to the active and passive elements in the network can be suitably an element selected from the valve metal group, or can be suitably an alloy such as chrome-gold, or Kovar-gold.

The significance of the present invention can be appreciated by considering its novelty and utility in combination wth diffused and epitaxial semiconductor technologies. The preparation of substantially planar thin film dielectrics is completely compatible with silicon and gallium arsenide integrated circuit technologies since the preparation of the capacitor structures in no way harms the already prepared active components. It is seen that various electrochemical means can be employed for forming the dielectric of the instant invention or dry anodization, plasma techniques, reactive sputtering or physical sputtering may also be employed for preparation of the dielectric material. Thermal oxidation as applied to tantalum has been found especially useful. In each of these situations, the employment of a very thin layer of an electrolyte to heal any imperfections in the dielectric layer, as well as provide good electrical contact to the dielectric film, has provided for a significantly improved device. The use of a very thin film of electrolyte material, such as an oxide of manganese or lead, in connection with the dielectric film is completely compatible with thin film technology and provides for a significantly improved dielectric structure.

While the specific examples described relate to capacitor structures, other dielectric configurations can utilize the inventive concept herein, and in particular, it can be employed in rectifier structures, as well as thin film diodes and triodes.

It may thus be seen that the instant invention is broad in scope and embraces such modifications as will be apparent to those skilled in the art, and those that will be particularly apparent after having received the benefit of the disclosures herein and the art equivalents thereof, as well as those specifically embraced within the scope of the instant invention. It is to be understood that the invention is not limited to any specific embodiments hereof excepting as defined by the appended claims.

Having thus described our invention, we claim:

1. A method for fabricating a thin film, substantially two-dimensional dielectric capacitor element comprising:
    (a) forming a first thin film metal electrode upon a substantially planar substrate,
    (b) forming a thin film dielectric layer upon and contiguous with said first metal electrode;
    (c) heating said substrate in the range of about 20° C. to about 100° C. while evaporating permanganic acid, in the presence of said substrate, thereby to vapor deposit a thin layer of manganese oxide on said dielectric layer as a decomposition product of said evaporated acid; and
    (d) forming a second thin metal electrode on said thin layer of manganese oxide.

2. The method according to claim 1 wherein said dielectric layer is vapor deposited upon said first metal electrode.

3. The method according to claim 1 wherein said dielectric layer is reactively sputtered upon said first metal electrode.

4. The method according to claim 1 wherein said first metal electrode is evaporated onto a semiconductor substrate and said second metal electrode is evaporated onto said layer of manganese oxide.

References Cited

UNITED STATES PATENTS

| | | | |
|---|---|---|---|
| 3,127,660 | 4/1964 | Gerondeau | 29—570 |
| 3,169,892 | 2/1965 | Lemelson | 29—577 |
| 3,241,008 | 3/1966 | Komisarek | 29—570 X |
| 3,290,761 | 12/1966 | Ho | 29—570 |
| 3,350,760 | 11/1967 | Kilby | 29—577 X |

OTHER REFERENCES

Hackh's Chemical Dictionary, 3rd edition, p. 633.

JOHN F. CAMPBELL, *Primary Examiner.*

RICHARD BERNARD LAZARUS, *Assistant Examiner.*

U.S. Cl. X.R.

117—106; 317—230